United States Patent [19]

Wertjes

[11] 4,221,312
[45] Sep. 9, 1980

[54] TIRE MOUNTING BRACKET FOR VEHICLES

[76] Inventor: Marvin G. Wertjes, 2118 Valley Park Dr., Cedar Falls, Iowa 50613

[21] Appl. No.: 921,217

[22] Filed: Jul. 3, 1978

[51] Int. Cl.² .............................................. B62D 43/04
[52] U.S. Cl. .............................. 224/42.21; 224/42.23; 224/42.25; 414/466
[58] Field of Search ............... 224/42.23, 42.12, 42.13, 224/42.21, 29 R, 273; 214/451, 453; 70/259

[56] References Cited

U.S. PATENT DOCUMENTS

| | | | |
|---|---|---|---|
| 1,672,356 | 6/1928 | Wasserfallen | 224/42.23 X |
| 2,584,233 | 2/1952 | Selzer | 214/454 |
| 3,790,012 | 2/1974 | Hrivnyak | 214/454 |
| 3,862,696 | 1/1975 | McCauley et al. | 244/42.23 |

*Primary Examiner*—Robert J. Spar
*Assistant Examiner*—Jerold M. Forsberg

*Attorney, Agent, or Firm*—Zarley, McKee, Thomte, Voorhees & Sease

[57] ABSTRACT

A tire mounting bracket for vehicles includes an elongated frame having upstanding side members on the forward end thereof which are pivotally connected to the underside of a vehicle for up and down pivotal movement of the rearward end of the frame between a generally horizontal transport position and a downwardly and rearwardly inclined service position. Collapsible tension members limit downward pivotal movement of the rearward end of the frame to the service position therefor. A second tension member is detachably connected to the rearward end of the frame to secure the frame in the transport position. The spare tire is retained on the frame between the second tension member and upstanding side members. A bracket on the underside of the frame cooperates with the rearward end of the frame to receive one end of a lever for pivotally raising and lowering the frame with a spare tire supported thereon.

5 Claims, 6 Drawing Figures

U.S. Patent    Sep. 9, 1980    4,221,312
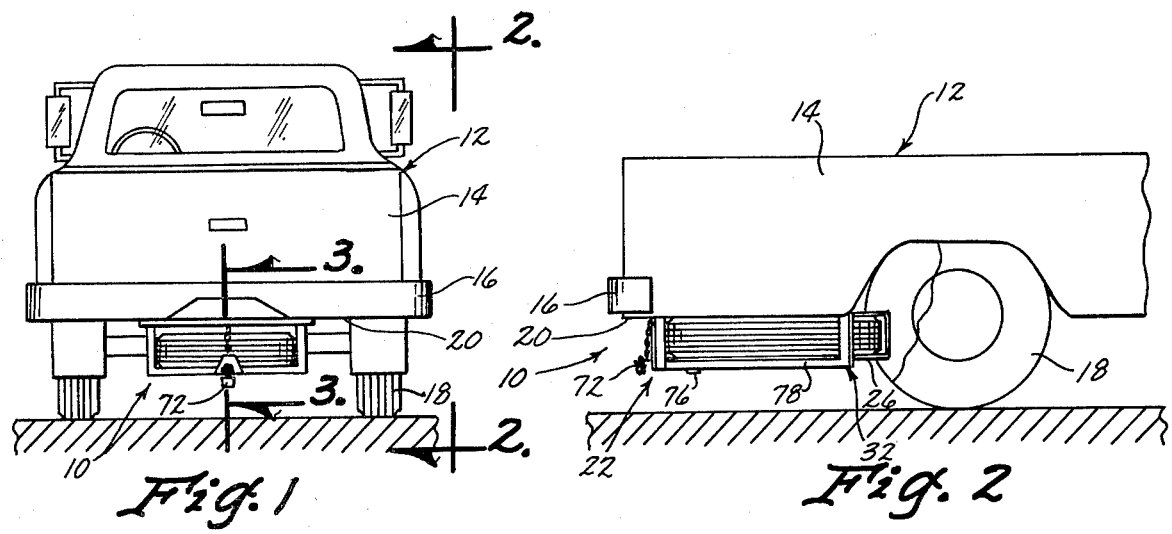
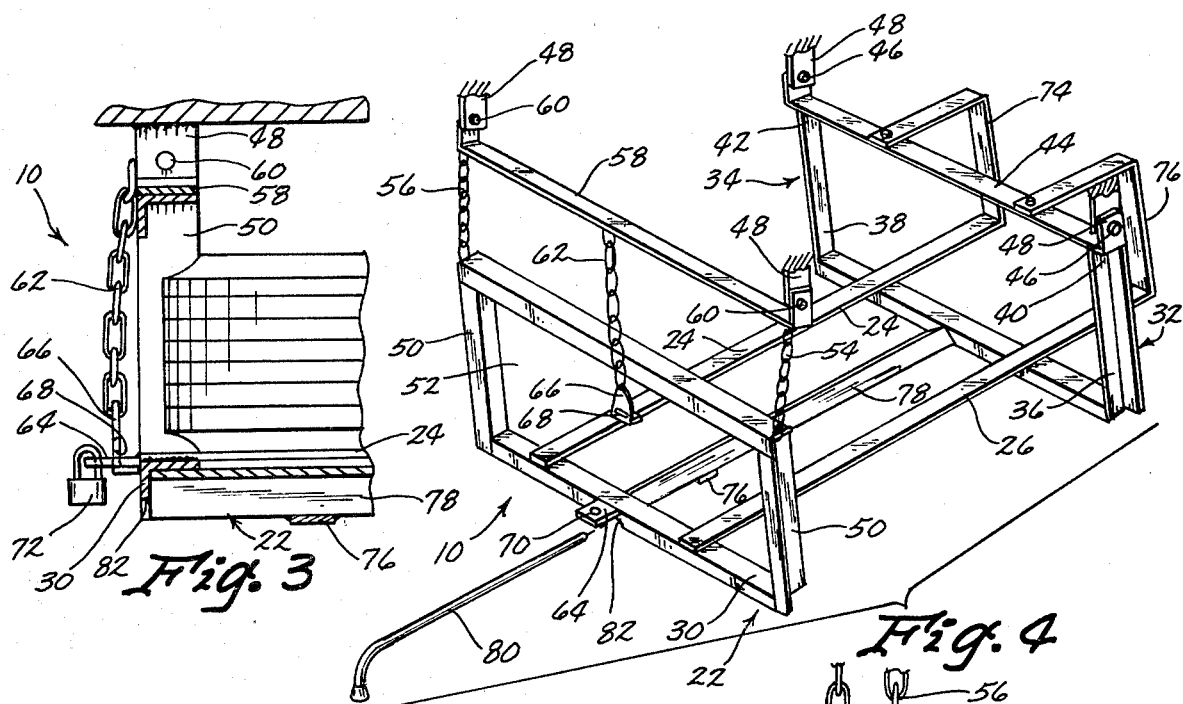
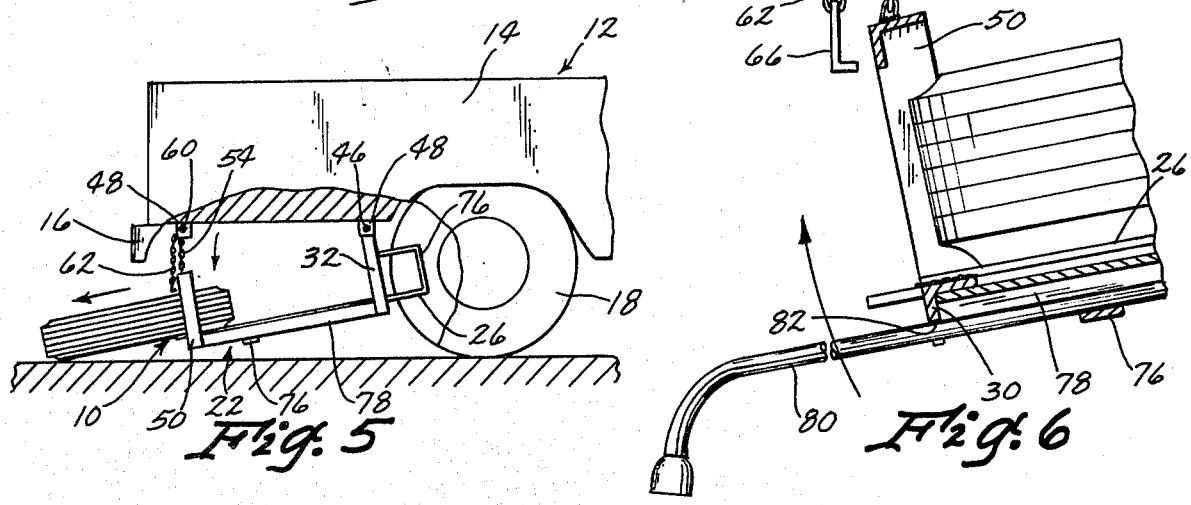

TIRE MOUNTING BRACKET FOR VEHICLES

BACKGROUND OF THE INVENTION

This invention relates generally to devices for supporting a spare tire on a vehicle and more particularlly to a pivotally mounted device on the underside of a vehicle for supporting a spare tire at that location.

There are devices in common use, primarily on pickup trucks, for supporting a spare tire at the rearward end of the truck beneath the box. Such devices generally include a carrier arm suspended at one end from the under side of the truck with the other end detachably suspended in similar fashion for clamping a spare tire between the arm and underside of the truck.

A problem with such devices, is that when one end of the carrier arm is unfastened for removing a spare tire, the detached end is wholly unsupported and can fall to the ground under the weight of the spare tire. This can be quite dangerous for an operator bent over at the rearward end of the truck with his hand inserted below the carrier arm for unfastening the detachably supported end.

Likewise, installation of a spare tire onto such a carrier arm is a strenuous job wherein the spare tire must be balanced on the arm and lifted all the way from the ground to its transport position and supported while a butterfly nut or the like is being attached for clamping the tire in the transport position.

Accordingly, it is a principal object of this invention to provide an improved tire mounting bracket for vehicles.

A further object of the invention is to provide a tire mounting bracket which is pivotally connected to the underside of a vehicle and which includes means for limiting downward pivotal movement of the bracket.

A further object of the invention is to provide a tire mounting bracket having collapsible tension members for supporting the bracket in an inclined service position.

A further object of the invention is to provide a tire mounting bracket having means for quickly and easily securing the bracket in its transport position.

A further object of the invention is to provide a tire mounting bracket which is easily attachable to the underside of a vehicle.

A further object of the invention is to provide a tire mounting bracket having a second tension member which serves to both retain a tire on the bracket and support the bracket in the transport position therefor.

A further object of the invention is to provide a tire mounting bracket which may be locked to prevent removal of the spare tire.

Finally, it is an object of the invention to provide a tire mounting bracket which is economical to manufacture, durable in use, and efficient in operation.

SUMMARY OF THE INVENTION

The tire mounting bracket of the present invention includes an elongated tire supporting frame having longitudinally spaced forward and rearward ends and laterally spaced opposite sides. The lower end portions of upstanding side members are connected to opposite sides of the frame adjacent the forward end. The upper end portions of the side members are pivotally connected to the underside of a vehicle for up and down pivotal movement of the rearward end of the frame between a generally horizontal transport position and a downwardly and rearwardly inclined service position. Means are provided for releasably securing the frame in the transport position. The tire mounting bracket may also include a frame member adapted for securement to the underside of a vehicle above the rearward end of the frame and a collapsible tension member connected to the frame member and to the rearward end of the frame for limiting downward pivotal movement of the frame to the service position. A bracket may be secured to the underside of the frame for receiving one end of a lever for facilitating the raising and lowering of the frame between the transport and service positions.

BRIEF DESCRIPTION OF THE DRAWINGS

FIG. 1 is a rear elevational view of the tire mounting bracket of the invention installed on a pickup truck;

FIG. 2 is a partial side view of the tire mounting bracket and truck of FIG. 1 with a portion of a truck tire broken away for clarity;

FIG. 3 is an enlarged side sectional view of a rear portion of the tire mounting bracket in the transport position, as seen on line 3—3 in FIG. 1;

FIG. 4 is a perspective view of the tire mounting bracket of the invention;

FIG. 5 is a side view similar to FIG. 2, but showing the mounting bracket in the lowered service position therefor; and FIG. 6 is an enlarged detail side sectional view of a rear portion of the tire mounting bracket in the service position therefor.

DESCRIPTION OF THE PREFERRED EMBODIMENT

The tire mounting bracket of the present invention is indicated generally at 10 in FIG. 1 installed on a conventional pickup truck 12. The truck includes a rear box 14, a rear bumper 16, a rear wheel 18 and an underside 20. The underside 20 may be defined by the truck frame (not shown), bottom of the box 14 or any other structure associated with the truck below the box.

Referring to the perspective view of FIG. 4, the tire mounting bracket includes an elongated tire support frame 22 comprising a pair of longitudinally extended and laterally spaced apart tire support members 24 and 26 which are connected together by laterally extended front and rear cross members 28 and 30. A pair of upstanding side members 32 and 34 have lower portions 36 and 38 respectively which are secured to opposite ends of the front cross member 28. Upper portions 40 and 42 are secured to opposite ends of a laterally extended frame means or front mounting bracket 44 having upturned ends which are pivotally connected by pins 46 to depending tabs 48 secured to the underside 20 of the truck 12. Accordingly, it can be seen that pivotal movement of the frame 22 about the pins 46 will result in up and down pivotal movement of the rearward end of the frame at the rear cross member 30.

Secured to the rear cross member 30 is an inverted U-shaped frame member 50 which serves as the rear wall of the frame. Rear wall 50 has an opening 52 which is wide enough and tall enough to provide for the insertion and removal of a spare tire through it.

Downward pivotal movement of the rearward end of the frame is limited by a pair of collapsible tension members, namely the chains 54 and 56 which are connected at one end to the U-shaped member 50 and at the other end to a rear mounting bracket 58 having up-turned ends also pivotally connected at 60 to depending tabs on the underside 20 of the truck 12. The chains 54 and 56, when fully extended, thus define a downward limit position or service position for the frame 22 as shown in FIGS. 5 and 6. The frame 22 is shown supported in a downwardly and rearwardly inclined relation for inserting a spare tire into the frame or removing a spare tire from the frame.

Normally, the frame 22 is supported in a generally horizontally disposed position or transport position as shown in FIGS. 1-3. In the transport position, the chains 54 and 56 are collapsed and the rearward end of the frame is vertically supported by a second collapsible tension member or chain 62 which is connected at one end to the rear mounting bracket 58 and detachably connected at the other end to the rear frame cross member 30. For this purpose, rear cross member 30 carries a rearwardly projected tab 64 and chain 62 carries an L-section coupling 66 on the lower end thereof. Coupling 66 has a slot 68 for receiving tab 64. The tab has a bore 70 for receiving a padlock 72 as shown in FIG. 3 for locking the frame in its transport position and preventing the removal of a tire supported thereon.

Chain 62 serves both to support the rearward end of the frame in the transport position and limit rearward movement of a spare tire supported on the frame. Forward movement of a spare tire is limited by upstanding frame members 74 and 76 positioned at the forward ends of the tire support members 24 and 26 forwardly of the front cross member 28. It can be seen in FIG. 2 that upstanding side member 32 is longitudinally spaced from the rear wall 50 by a distance less that the diameter of the spare tire 76 so that the side members and rear wall cooperatively limit lateral movement of a spare tire. In other embodiments, the side members and rear wall may be arranged to limit both lateral and longitudinal movement of a spare tire on the frame.

In order to provide leverage for raising and lowering the frame 22 between its transport and service positions, there is provided a bracket 76 on the underside of an elongated brace 78 extended between the front and rear cross members 28 and 30. Accordingly, a lever such as a conventional tire iron 80 may be inserted at one end into the bracket 76 with a medial portion receivable within a notch 82 in the rear cross member 30. Thus, referring to FIG. 6, it can be seen that the rearward end of tire iron 80 is thus positioned rearwardly of the rear wall 50 to provide ample leverage for lifting the frame 22 to its transport position.

The tire mounting bracket 10 can be easily installed on a vehicle by fastening the depending tabs 48 to the underside of the vehicle by nuts and bolts, welding or the like, and then simply inserting the pivot pins 60 for supporting the front and rear mounting brackets on the tabs 48. Customarily, the tire mounting bracket 10 will be installed with the rear wall 50 positioned at and parallel to the rear end of the vehicle. It is to be understood, however, that the tire mounting bracket could be oriented so that the rear wall 50 faces a different side of the vehicle either in front of or behind the rear wheel 18. In this connection, it should be understood that the terms longitudinal, lateral, forward and rearward are used for purposes of orientation with respect to the tire mounting bracket 10 itself and may not correspond with the longitudinal, forward etc. directions associated with the vehicle.

Once the tire mounting bracket 10 is installed, a spare tire may be easily inserted onto the frame 22 by sliding it up the inclined tire support members 24. A tire iron 80 is then easily inserted under the rear frame cross member 30 and into bracket 76 to provide a handle for raising the frame 22 to its transport position. Note that the tire iron 80 may extend rearwardly of the vehicle bumper 16 so that the operator may stand firmly and comfortably behind the vehicle without reaching below the structure supporting the spare tire 14. When the tire and frame are raised to the transport position, the L-shaped coupling 66 on the end of chain 62 may be quickly and easily fit onto tab 64 for relieving the load supported by tire iron 80. The operator can then leisurely install padlock 72 onto tab 64 for locking the spare tire in place below the vehicle.

Thus there has been shown and described a tire mounting bracket which accomplishes at least all of the stated objects.

I claim:

1. A structure for supporting a spare tire on the underside of a vehicle, comprising, an elongated tire supporting frame having longitudinally spaced forward and rearward ends and laterally spaced opposite sides, upstanding side members having upper and lower end portions, the lower end portions being connected to opposite sides of said frame adjacent the forward end thereof, means for pivotally connecting said upper end portions to the underside of a vehicle for up and down pivotal movement of the rearward end of the frame between a generally horizontal transport position and a downwardly and rearwardly inclined service position, a rear mounting bracket adapted for securement to the underside of a vehicle above the rearward end of said frame, a collapsible tension member connected to said rear mounting bracket and to the rearward end of said frame, said tension member being collapsed in non-load bearing relation when the frame is in the transport position and extended in load bearing relation when the frame is in the service position to limit downward pivotal movement of the rearward end of the frame to the service position, means for releasably securing said frame in the transport position including a second tension member connected at one end to said rear mounting bracket and detachably connected at the other end to the rearward end of the frame in the transport position, said second tension member being laterally positioned relative to the frame to limit rearward movement of a spare tire supported on said frame in the transport position.

a lifting bracket connected to the frame forwardly of the rearward end of the frame, said bracket adapted to receive one end of an elongated lever which may be extended rearwardly beyond and lifted against said rear cross member to provide leverage for lifting the frame from the service position to the transport position.

2. The structure of claim 1 further comprising means for locking said second tension member to the rearward end of the frame whereby rearward removal of a spare tire is prevented.

3. The structure of claim 1 including an upstanding frame member on the forward end of said frame for limiting forward movement of the spare tire supported on said frame.

4. The structure of claim 1 further comprising another collapsible tension member connected to said frame means and to the rearward end of said frame, said collapsible tension members being arranged in laterally spaced-apart relation.

5. The structure of claim 4 wherein said rear mounting bracket is laterally extended and has opposite end portions adapted for securement to the underside of a vehicle, and said second tension member being connected to and suspended from a medial portion of said rear mounting bracket.

* * * * *